United States Patent [19]

Tazi et al.

[11] Patent Number: 5,034,487

[45] Date of Patent: Jul. 23, 1991

[54] PROCESS FOR MAKING COPOLYMERS OF MALEIC ANHYDRIDE AND A $C_1$-$C_4$ ALKYL VINYL ETHER HAVING A HIGH SPECIFIC VISCOSITY

[75] Inventors: Mohammed Tazi, Wayne; John J. Ardan, Butler, both of N.J.

[73] Assignee: GAF Chemicals Corporation, Wayne, N.J.

[21] Appl. No.: 565,002

[22] Filed: Aug. 9, 1990

[51] Int. Cl.$^5$ ............................................. C08F 34/02
[52] U.S. Cl. ................................................... 526/271
[58] Field of Search ........................................ 526/271

[56] References Cited

U.S. PATENT DOCUMENTS

| | | | |
|---|---|---|---|
| 2,782,182 | 2/1957 | Verburg | 526/86 |
| 3,532,771 | 10/1970 | Field et al. | 526/271 |
| 3,553,183 | 1/1971 | Field et al. | 526/201 |
| 3,632,561 | 1/1972 | Gibb et al. | 526/219.4 |
| 4,370,454 | 1/1983 | Messmer et al. | 526/271 |

Primary Examiner—Joseph L. Schofer
Assistant Examiner—Alex H. Walker
Attorney, Agent, or Firm—Walter Katz; Marilyn J. Maue; Joshua J. Ward

[57] ABSTRACT

What is described herein is a process for making a copolymer of high specific viscosity by polymerization of maleic anhydride and a $C_1$-$C_4$ alkyl vinyl ether monomer. The invention involves polymerizing said monomers to form a slurry of said copolymer in excess alkyl vinyl ether and toluene and is characterized by the steps of: (a) precharging a reactor with $C_1$-$C_4$ alkyl vinyl ether as solvent at a reaction temperature, (b) feeding a mixture of maleic anhydride and a $C_1$-$C_4$ alkyl vinyl ether in substantially stoichiometric amounts, preferably with a slight excess of the alkyl vinyl there, and at a selected rate, into said precharged reactor, and (c) simultaneously feeding a predetermined mixture of toluene and a polymerization initiator continuously over substantially the entire period of polymerization.

11 Claims, No Drawings

`5,034,487`

PROCESS FOR MAKING COPOLYMERS OF MALEIC ANHYDRIDE AND A $C_1$-$C_4$ ALKYL VINYL ETHER HAVING A HIGH SPECIFIC VISCOSITY

BACKGROUND OF THE INVENTION

1. Field of the Invention

This invention relates to copolymers of maleic anhydride and a $C_1$-$C_4$ alkyl vinyl ether, and, more particularly, to a process for making such copolymers of high specific viscosity.

2. Description of the Prior Art

Commercial processes are available for making copolymers of maleic anhydride and a $C_1$-$C_4$ alkyl vinyl ether. However, it has been found necessary to provide a different process for a copolymer of low specific viscosity, or molecular weight, than for a copolymer of medium range viscosity, and still another process for a copolymer of relatively high specific viscosity.

In these several processes, the molecular weight of the copolymer can be controlled either by adjusting the temperature of the polymerization, the concentration of the polymerization initiator and/or the kind of solvent utilized for the polymerization. Usually, higher polymerization temperatures will produce lower molecular weight copolymers, while higher concentrations of the polymerization initiator will produce lower molecular weight copolymers. The effect of the solvent used is to combine with the free radicals produced by the initiator to terminate the reaction at a point at which the polymerization had progressed on a particular chain. This degree of interference with the polymerization on the part of the solvent can be determined from its chain transfer constant. Solvents having a low chain transfer constant, such as benzene, exhibit only a relatively slight tendency to interfere with chain-reaction type polymerizations; while solvents with a relatively high chain transfer constant, such as xylene, exert a rather high degree of interference with such polymerizations. Accordingly, for processes defined by a given polymerization temperature and initiator level, a low chain transfer constant solvent generally will produce higher viscosity (higher molecular weight) copolymers while higher constant solvents will provide lower viscosity (lower molecular weight) copolymers.

Accordingly, it is an object of this invention to provide a process for making copolymers of maleic anhydride and a $C_1$-$C_4$ alkyl vinyl ether having a high specific viscosity.

A particular object of this invention is to provide a process in which a solvent having a high chain transfer constant, and a polymerization initiator, are introduced continuously during the polymerization to produce copolymers having high specific viscosities.

These and other objects and features of the invention will be made apparent from the following description of the invention.

SUMMARY OF THE INVENTION

What is described herein is a process for making a copolymer of high specific viscosity by polymerization of maleic anhydride and a $C_1$-$C_4$ alkyl vinyl ether monomer. The invention involves polymerizing said monomers to form a slurry of said copolymer in excess alkyl vinyl ether and toluene and is characterized by the steps of: (a) precharging a reactor with $C_1$-$C_4$ alkyl vinyl ether as solvent at a reaction temperature, (b) feeding a mixture of maleic anhydride and a $C_1$-$C_4$ alkyl vinyl ether in substantially stoichiometric amounts, preferably with a slight excess of the alkyl vinyl ether, and at a selected rate, into said precharged reactor, and (c) simultaneously feeding a predetermined mixture of toluene and a polymerization initiator continuously over substantially the entire period of polymerization.

DETAILED DESCRIPTION OF THE INVENTION

In accordance with the present invention, there is provided a process for making copolymers of maleic anhydride and a $C_1$-$C_4$ alkyl vinyl ether having high specific viscosities. In this method, a suitable reactor is provided with appropriate inlet tubes, agitation means, and heater and temperature control means. The reactor is first purged with nitrogen to remove air from the system. Generally three separate purges are employed, at about 3 bars pressure and about 40° C. Then the reactor is precharged with a substantial excess of $C_1$-$C_4$ alkyl vinyl ether, preferably methyl vinyl ether, which functions as a solvent to facilitate agitation of the contents of the reactor before and during the polymerization. The alkyl vinyl ether solvent then is heated to a reaction temperature, generally about 50°–90° C., and preferably about 60° C.

Then separate feed tubes carrying molten anhydride and alkyl vinyl ether are combined in a static mixer and fed into the precharged reactor while agitating the solvent. The maleic anhydride and alkyl vinyl ether reactants usually are combined in substantially stoichiometric ratios of about 1:1, although a slight excess of alkyl vinyl ether monomer is preferred in order to assure that all the maleic anhydride reactant will be complexed by the vinyl ether. Suitably a mole ratio of about 1:1.05 to about 1:1.7 is used, although a 1:1.5 mole ratio is preferred.

The combined maleic anhydride-alkyl vinyl ether feed stream is added to the reactor at a substantially constant feed rate over a suitable period of polymerization. Generally, a period of about 3 hours for addition the mixture of both monomers is typical of the process.

The mole ratio of MVE:MA in total present in the reactor during the polymerization suitably is about 3:1 to about 10:1, although lower and higher ratios also may be used. Preferably, a mole ratio of about 8:1 is used.

As a feature of the invention, during substantially the entire period of the polymerization, predetermined amounts of toluene and polymerization initiator are introduced continuously into the reactor to control the course of the polymerization. Any suitable initiator known in the art may be used including but not limited to peroxides such as lauryl peroxide. Tertiary-butyl or tertiary-amylperoxy pivalates are preferred. The concentration of initiator may vary widely, but is suitably about 0.05 to 2% by weight of maleic anhydride present, although about 0.1% by weight usually will suffice for carrying out an effective polymerization.

After the polymerization, the reactor is cooled, excess alkyl vinyl ether (which contains about 10% toluene) is vented off, and additional toluene is added as a solvent to replace the vented vinyl ether. Then the resultant copolymer slurry in toluene is discharged from the reactor. The copolymer powders can be recovered by filtration and drying. The product is a fine white powder of high specific viscosity with very low residual toluene, generally less than 1%. The copolymer also is quite stable as evidenced by the fact that its viscosity remains substantially constant even after a period of weeks or months.

The vented alkyl vinyl ether-10% toluene mixture can be recycled to function as the precharge in the reactor.

The presence of toluene in the process acts to stabilize the copolymer produced. A suitable amount of toluene for use in the process will produce a reaction slurry mixture at about a 25% solids level after venting alkyl vinyl ether.

The specific viscosities obtained in this process generally range from about 2 to 4, and usually about 3, as determined as a 1% solution in 2-butanone.

The invention will now be described by reference to the following working examples of the invention.

EXAMPLE 1

A reactor equipped with suitable inlet tubes, agitation means, and heater and temperature control means, was purged three times with nitrogen at 3 bars pressure and at 40° C. The purged reactor then was precharged with a recycled mixture of 192.4 g. of methyl vinyl ether containing 19.24 g. of toluene, and heated to 60° C. Then separate streams of 52.5 g. of molten maleic anhydride and 48.0 g. of methyl vinyl ether were combined in a static mixer and introduced into the reactor over a period of 3 hours while agitating the reaction mixture After 5 minutes, and thereafter simultaneous with addition of monomers, a solution of 128 g. of toluene and 0.066 g. of lauryl peroxide were introduced into the reactor over the 3-hour period of polymerization. The contents of the reactor then were held at 60° C. for 1 hour, cooled to room temperature, and excess methyl vinyl ether was vented. Then 100 g. of toluene was added. The resultant slurry was discharged from the reactor, filtered, and the solid obtained was dried. 75 g. (90.2% yield) of the desired copolymer was collected as a fine white powder. The specific viscosity of the copolymer powder was 2.54, determined as a 1% solution in 2-butanone. A triphenylphosphite test was negative showing the substantial absence of residual monomers. The toluene level in the copolymer was only 0.75%. The viscosity of the copolymer was observed to remain substantially constant during a test period of 3 months.

Table 1 below summarizes the experimental conditions of this example.

TABLE I

| SUMMARY OF EXPERIMENTAL CONDITIONS OF EXAMPLE 1 | | | | | | | | | |
|---|---|---|---|---|---|---|---|---|---|
| Precharged Reactor | | | | | Monomer Feed Composition | | | | |
| Excess MVE | | Toluene | | Temp. | MA | | MVE | | Mole Ratio |
| (g) | (moles) | (g) | (% of MVE) | (°C.) | (g) | (mole) | (g) | (mole) | MA:MVE |
| 192.4 | 3.3 | 19.24 | 10 | 60 | 52.5 | 0.54 | 47.99 | 0.83 | 1:1.5 |

| Toluene and Initiator Feed Composition | | | Total Addition of | | | |
|---|---|---|---|---|---|---|
| Toluene | Initiator | | Monomer Mole Ratio | Toluene/ Initiator | Polymerization Period | |
| (g) | (g) | (% wt.) | MVE:MA | (g) | (hrs) | |
| 128 | 0.066 | 0.125 | 8:1 | 147.24/0.066 | 3 | |

What is claimed is:

1. A process for the production of copolymers of maleic anhydride and $C_1$-$C_4$ alkyl vinyl ethers of high specific viscosities which comprises:

(a) precharging a reactor with $C_1$-$C_4$ alkyl vinyl ether in an amount sufficient to function as a solvent in the process at a reaction temperature of about 50°-90° C.,
   (b) feeding a reactant mixture which is a complex of maleic anhydride and a $C_1$-$C_4$ alkyl vinyl ether in substantially stoichiometric amounts into said precharged reactor at a selected rate,
   (c) simultaneously feeding a mixture of toluene and a polymerization initiator into the reactor substantially continuously over the entire period of polymerization, and
   (d) copolymerizing said reactant mixture in said ether solvent and added toluene to form a slurry of said high specific viscosity copolymer therein.

2. A process according to claim 1 further including:
   (e) venting excess alkyl vinyl ether,
   (f) discharging the slurry copolymer product from the reactor, and
   (g) recovering the copolymer as a fine, white powder.

3. A process according to claim 1 wherein a copolymer having a specific viscosity of about 2 to 4 is obtained as determined as a 1% solution of the copolymer in 2-butanone.

4. A process according to claim 1 wherein the amount of toluene present in the reactor will provide a slurry product at about a 25% solids level after venting alkyl vinyl ether.

5. A process according to claim 1 wherein a mixture of molten maleic anhydride and alkyl vinyl ether reactants is fed into said reactor at a mole ratio of about 1:1.05 to about 1:1.7, respectively.

6. A process according to claim 5 wherein the said mole ratio is about 1:1.5 and specific viscosity of the copolymer product is about 3.0.

7. A process according to claim 1 wherein the mole ratio of alkyl vinyl ether to maleic anhydride in total in the reactor during the polymerization is about 3:1 to about 10:1, respectively.

8. A process according to claim 7 wherein the total alkyl vinyl ether to maleic anhydride mole ratio in the reactor is about 8:1.

9. A process according to claim 1 wherein said alkyl vinyl ether is methyl vinyl ether.

10. A process according to claim 2 wherein toluene is added to the reaction product before discharge.

11. A process according to claim 2 wherein the vented alkyl vinyl ether containing toluene is recycled as the precharge.

* * * * *